United States Patent [19]
Hulse et al.

[11] Patent Number: 5,533,607
[45] Date of Patent: Jul. 9, 1996

[54] ARTICLE HANDLING APPARATUS

[75] Inventors: David K. Hulse; William C. Barnett, both of Stoke-On-Trent, England

[73] Assignee: Royal Doulton (UK) Limited, Stoke-on-Trent, England

[21] Appl. No.: 408,908

[22] Filed: Mar. 22, 1995

[30] Foreign Application Priority Data

Mar. 24, 1994 [GB] United Kingdom .................. 9405820

[51] Int. Cl.$^6$ .................................................. B65G 47/68
[52] U.S. Cl. ............................................ 198/448; 198/444
[58] Field of Search .................................. 198/438, 444, 198/447, 468.4, 427, 428, 448

[56] References Cited

U.S. PATENT DOCUMENTS

| | | | |
|---|---|---|---|
| 2,375,936 | 5/1945 | McNamara et al. | 198/448 X |
| 3,144,119 | 8/1964 | Nigrelli et al. | 198/444 |
| 3,244,267 | 4/1966 | Berta | 198/448 |
| 3,628,649 | 12/1971 | Arvisnet | 198/444 |
| 3,774,748 | 11/1973 | Dederer et al. | |
| 4,147,013 | 4/1979 | Seragnoli | 198/468.4 X |
| 4,621,725 | 11/1986 | Rutter | 198/448 |
| 5,004,093 | 4/1991 | Blezard | 198/468.2 |

FOREIGN PATENT DOCUMENTS

| | | | |
|---|---|---|---|
| 5124724 | 5/1993 | Japan | 198/448 |
| 1133544 | 2/1967 | United Kingdom . | |
| 1296866 | 2/1970 | United Kingdom . | |
| 1346849 | 12/1971 | United Kingdom . | |

*Primary Examiner*—James R. Bidwell
*Attorney, Agent, or Firm*—Watts, Hoffmann, Fisher & Heinke Co.

[57] ABSTRACT

Apparatus for transferring articles from a plurality of input lines to a single independently drive output line includes a device for lifting articles from each input line in turn and transferring them to a position adjacent the output line, and a control mechanism for controlling deposit of the articles on the output line dependent on the rate of movement of the output line, whereby articles transferred from the input lines are placed on the output line in equi-spaced relation.

33 Claims, 4 Drawing Sheets

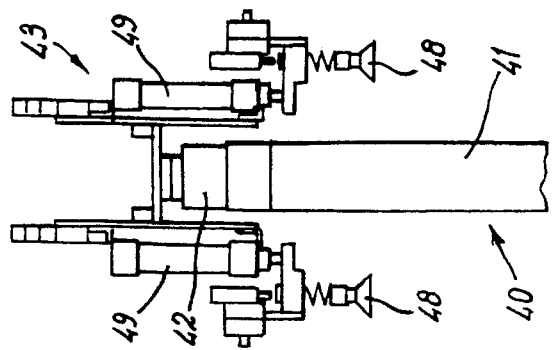
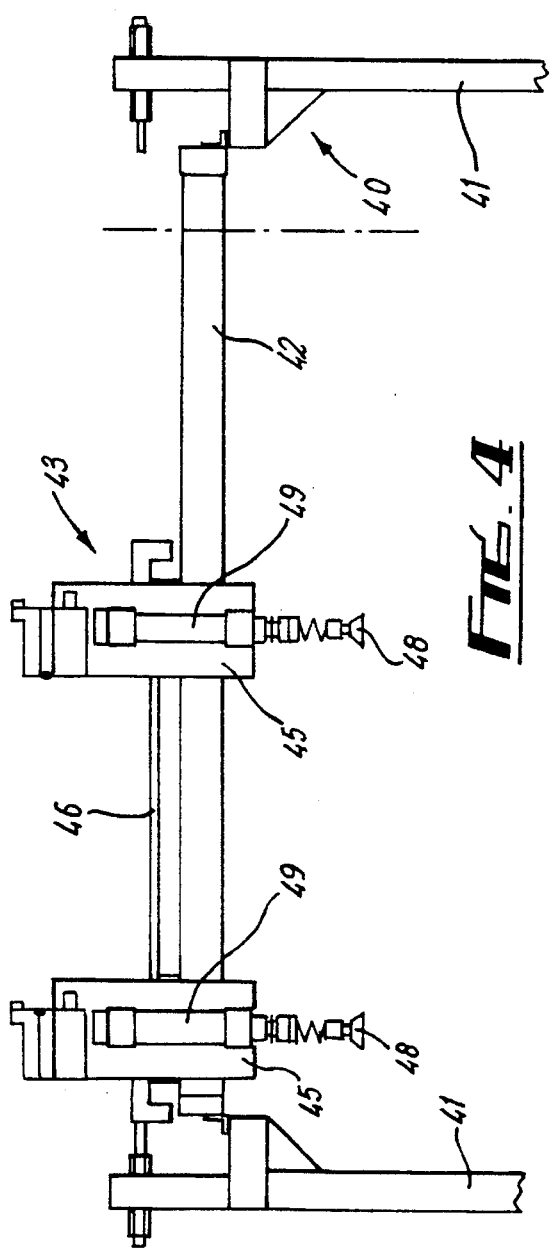
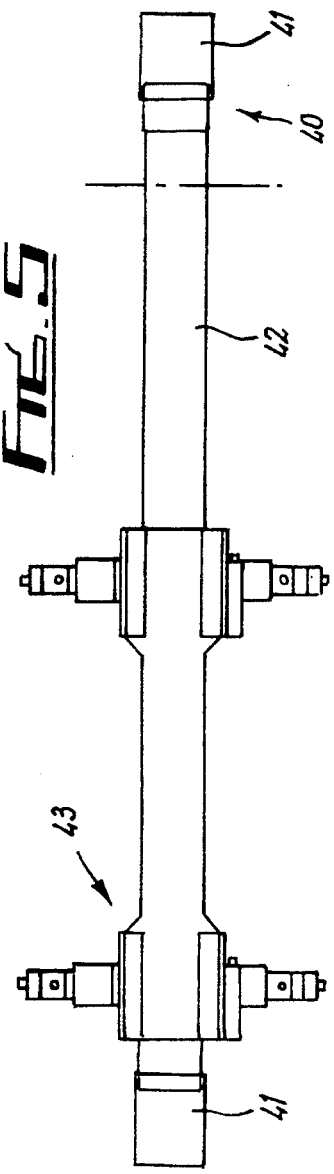

ARTICLE HANDLING APPARATUS

This invention relates to apparatus for handling articles and is especially, but not exclusively, applicable to the handling of articles of ceramic flatware or holloware.

In the production of ceramic articles by modern assembly line production methods, difficulties can arise in that certain production stages are more time consuming than others. It is difficult therefore to construct an assembly line in which articles flow uniformly along the line without gaps in the flow due to delay while slower operations are carried out or articles catching up with one another following completion of more rapid operations.

In the glazing of ceramic articles, articles to be glazed first require to be cleaned to remove dust, ceramic or other contaminant particles which would detract from the appearance of the glazed products. The cleaning operation is relatively time consuming compared to later stages of the glazing process and to attain uniform flow of articles along a glazing line it has been found necessary to operate two cleaning units in parallel. A problem then arises in transferring the output from the two cleaning units to the single production line in a uniform manner.

It is an object of the present invention to obviate or mitigate this difficulty.

The invention provides a method of transferring articles from two input production lines to a single output line comprising transferring produces from each input line alternately to the vicinity of the output line, and controlling deposit of the articles on to the output line dependent on the rate of movement of articles along the output line, whereby articles from both input lines are alternately deposited in the output line in uniformly spaced relation.

Preferably deposit of articles on to said output line is delayed pending movement of articles previously deposited thereon along the line by a predetermined distance.

Advantageously a plurality of articles is simultaneously transferred from each input line to the vicinity of said output line, said articles being equi-spaced in the direction of movement of said output line and deposit of the articles being delayed until the article last deposited on said output line has moved along the output line by a distance equal to the spacing between the articles transferred from said input line.

The invention also provides apparatus for transferring articles from a plurality of input lines to a single output line, the apparatus including means for lifting articles from each input line in turn and transferring same to a position adjacent said output line, and means for controlling deposit of said articles on said output line dependent on the rate of movement of the output line, whereby articles transferred from said input lines are placed on said output line in equi-spaced relation.

Said means for lifting articles from said input line and depositing them on to said output line may comprise suction members operable to engage and transport the articles and means for releasing the suction whereby to deposit the articles on said output line.

Preferably the apparatus includes signalling means responsive to the presence of articles in said input lines to sense which of said input lines is further advanced and direct said transfer means initially to the appropriate input line on start-up of the apparatus.

Preferably also the apparatus includes means operable in the event of an accumulation of articles on one or other of said input lines to suspend operation of a previous work station delivering to the associated input line until the accumulated articles have been transferred to said output line.

Preferably also the apparatus includes control means operable in the event said transfer means fails to collect and/or deposit an article to energise warning means and/or initiate shut down of said input lines.

In the case of apparatus adapted to transfer a plurality of articles from each input line in turn, means is preferably provided to maintain said articles a predetermined spaced distance apart corresponding to the desired spacing of articles on said output line.

An embodiment of the invention will now be described, by way of example only, with reference to the accompanying diagrammatic drawings, in which:

FIG. 4 is a front view of a transfer unit incorporated in the machine of FIGS. 1 to 4 viewed on the line IV—IV in FIG. 1;

FIG. 5 is a plan view oft the unit shown in FIG. 4; and

FIG. 6 is an end view of the unit shown in FIGS. 4 and 5.

Figure 1:
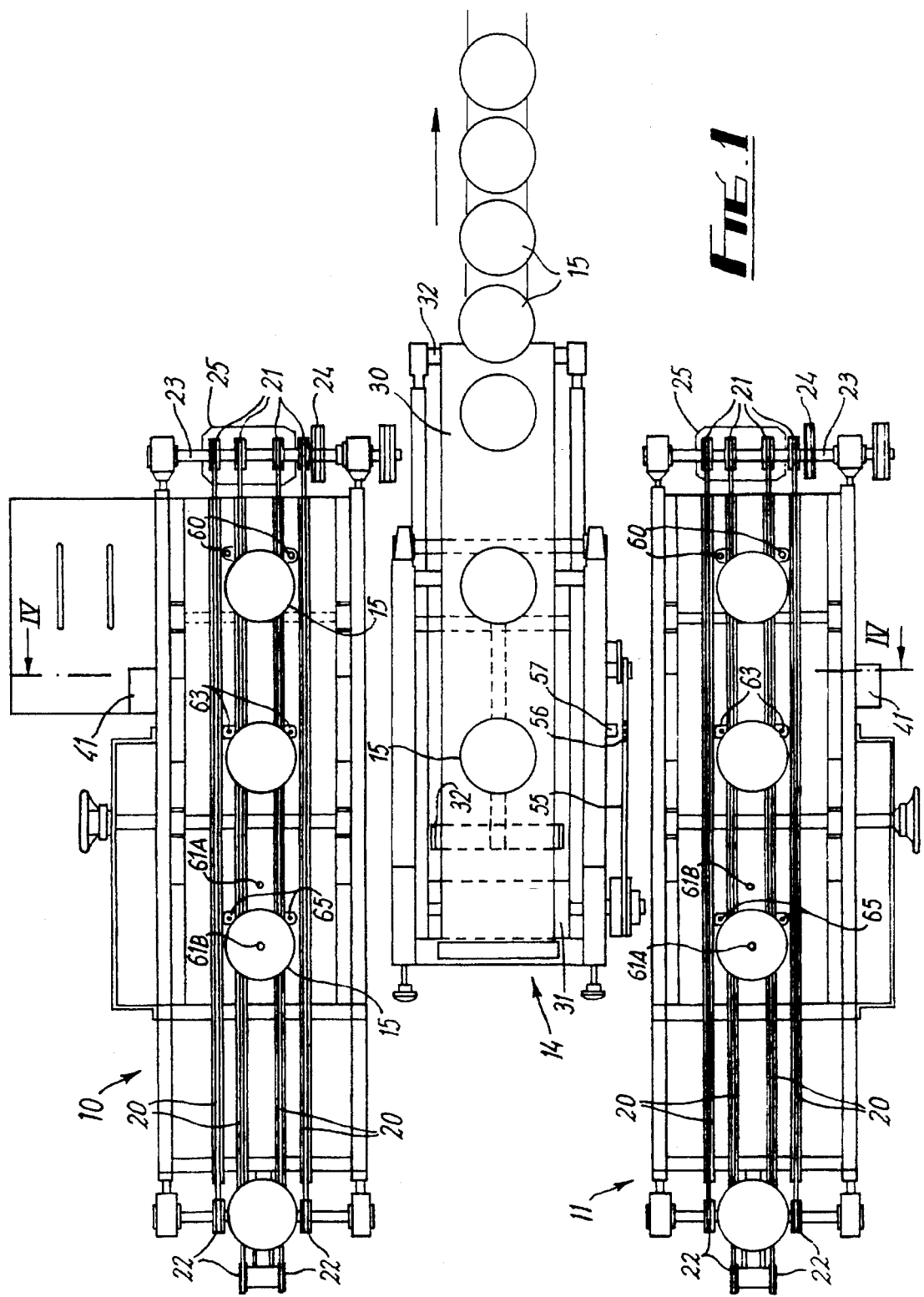
FIG. 1 is a plan view of one form of apparatus for transferring articles from two input lines to a single output line, certain parts being omitted for clarity.

The illustrated apparatus is adapted to transfer articles of ceramic flatware such as plates, saucers or the like delivered from a pair of side-by-side brushing or cleaning units to a single output line along which the plates are conveyed to a glazing unit. The brushing and glazing units do not form part of the invention and will be referred to only briefly. Referring to FIG. 1 the apparatus includes two input lines 10 and 11 each of which constitutes the output from an associated brushing unit (not shown). The lines 10 and 11 however constitute input lines to the apparatus of the invention. Located between the input lines 10 and 11 is a single output line 14 on to which articles from the input lines are transferred.

Each of the input lines 10,11, comprises a conveyor consisting of four spaced parallel belts 20 entrained around driving pulleys 21 and idler pulleys 22 at opposite ends of the conveyor. Each of the input conveyors 10,11 is driven continuously by drive shaft 23 through a belt and pulley arrangement 24 from a respective driving motor 25. Plates 15 discharged on to the input lines 10 and 11 from the respective brushing units move along the conveyors until arrested in predetermined positions by stop means the operation of which will be described hereafter.

The output line 14 comprises a conveyor belt 30 entrained round a driving roller 31 and idler rollers 32. The conveyor 30 is driven through a belt and pulley assembly 33 from a drive motor 34. In operation of the apparatus, articles delivered to the input conveyors 10 and 11 from the respective brushing units are transferred in sequence to the output conveyor 30 by a transfer unit now to be described.

Referring to FIGS. 4 to 6 the transfer unit comprises a gantry 40 extending across the overlapping regions of both the input lines 10,11 and the output line 14. The gantry is supported on vertical uprights 41 and incorporates a horizontal air cylinder 42 on which a transfer mechanism 43 is slidably mounted.

The transfer mechanism 43 incorporates a pair of cradles 45 of generally inverted U-shaped form surmounting the cylinder 42. The cylinder 42 is a rodless cylinder incorporating a pair of interlinked pistons slidably movable in the cylinder and connected to respective ones of the cradles 45 by pins projecting upwardly from the respective pistons through a longitudinal slot (not shown) formed in the upper surface of the cylinder. The cylinder 42 thus constitutes a track along which the cradles 45 may travel in unison in alternate directions by supplying air under pressure alternately to the opposite ends of the cylinder. A flexible seal closes the slot in the upper surface of the cylinder around the projecting cradle-supporting pins as they move along the cylinder.

The spacing between the cradles 45 corresponds to the distance between the centre lines of the input and output conveyors. In this way when the transfer mechanism is in the position shown in FIG. 4, one cradle is disposed above one of the input conveyors and the other above the output conveyor. When the mechanism moves to the opposite end of the cylinder 42, the first cradle adopts a central position over the outlet conveyor and the other cradle is positioned over the second inlet conveyor.

A pair of transfer members in the form of suction cups 48 connectible to a source of vacuum are mounted one on each of the downwardly depending arms of each cradle 45. Each suction cup is connected to the associated cradle through a pneumatic cylinder 49 which may be extended from the raised retracted position shown in FIGS. 4 and 6 to an extended lowered position in which the suction cups 48 engage the upper surfaces of plates delivered to the input conveyors from the respective brushing units. When the suction cups are in their lowered positions vacuum is applied to adhere them to the plates. The units may then be raised and the transfer mechanism traversed along the cylinder 42 to bring the plates over the outlet conveyor 30. The units may then be lowered and the suction released to drop the plates on to the outlet conveyor at the appropriate time as will be described hereafter.

In operation of the apparatus the transfer mechanism traverses from one side to the other of the cylinder 42 and picks up a pair of plates from each inlet conveyor in turn. The mechanism then traverses to position the plates above the output conveyor on to which they are released at a predetermined time related to the rate of movement of the output conveyor and the distance between plates previously deposited thereon.

Because the rate of delivery of the plates from the brushing units may vary relative to the rate of deposit of plates on the output conveyor, and since plates will not be delivered from the brushing units in precise synchronism, means are incorporated to sense which brushing unit is ahead of the other and to delay delivery of plates from the brushing units in the event the rate of deposit on the output conveyor is sufficiently slow to cause an accumulation of plates delivered from the brushing units.

To ensure the transfer mechanism moves to the correct input conveyor on start-up, that is to the conveyor which is first to receive plates from its associated brushing unit, sensing means is incorporated in each brushing unit to generate a signal when the brushing operation on each article is completed. This signal controls the supply of air to the cylinder 42, the arrangement being such that the cylinder drives the mechanism in the direction of the brushing unit from which a signal is first received. Once the mechanism is in operation the transfer mechanism moves alternately from end to end of the cylinder 42 to transfer plates successively from each input line in turn on to the central output line.

Figure 3:
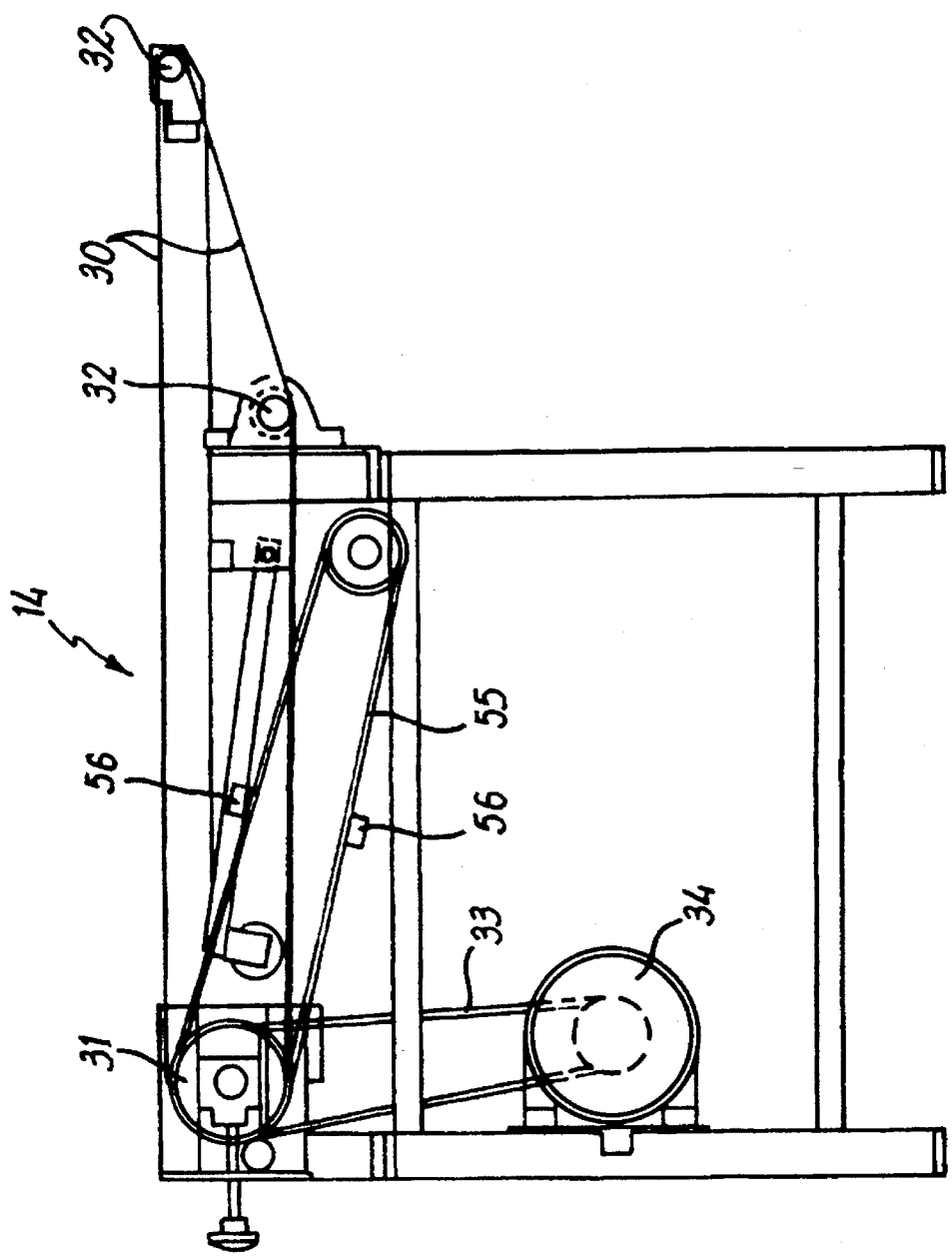
FIG. 3 is a side elevation of the output line shown in FIG. 1.

Release of plates on to the output line is controlled in a manner such that the plates are deposited on the output conveyor a predetermined fixed distance apart. This distance corresponds to the distance between each pair of suction members. Thus when plates are located over the output conveyor for release, release is delayed until the distance in the direction of the conveyor movement between the last plate to be deposited on the conveyor and the first of the plates about to be deposited, is equal to the spacing between the two plates about to be deposited.

for this purpose sensing means is incorporated to control release of plates on to the output conveyor. As seen in FIGS. 1 and 3, a timing chain 55 is driven in synchronism with the output conveyor 30. The length of the chain 55 is equal to twice the spacing between the plates to be deposited on the output conveyor. A pair of projections 56 are mounted at diametrically opposed positions on the chain 55 and are arranged during rotation of the chain to pass adjacent a proximity sensor 57. Upon each projection passing the sensor 57 a signal is generated which disconnects the suction members 48 from the associated source of vacuum and thus releases the plates to drop on to the outlet conveyor. Since two plates are dropped simultaneously and since the distance which the conveyor has moved since the last drop is equal to twice the spacing between plates, the distance between the leading plate and the last plate deposited on the outlet conveyor is the same as the distance between the two plates which are deposited simultaneously.

Thereafter the transfer mechanism traverses in the opposite direction to convey plates from the other input conveyor into position over the outlet conveyor and these plates are released in the same manner when the second of the two projections 56 passes the proximity switch 57. In this way release of the plates on to the outlet conveyor is determined by the speed of movement of the latter and the plates are deposited on the outlet conveyor in uniformly spaced fashion.

Figure 2:
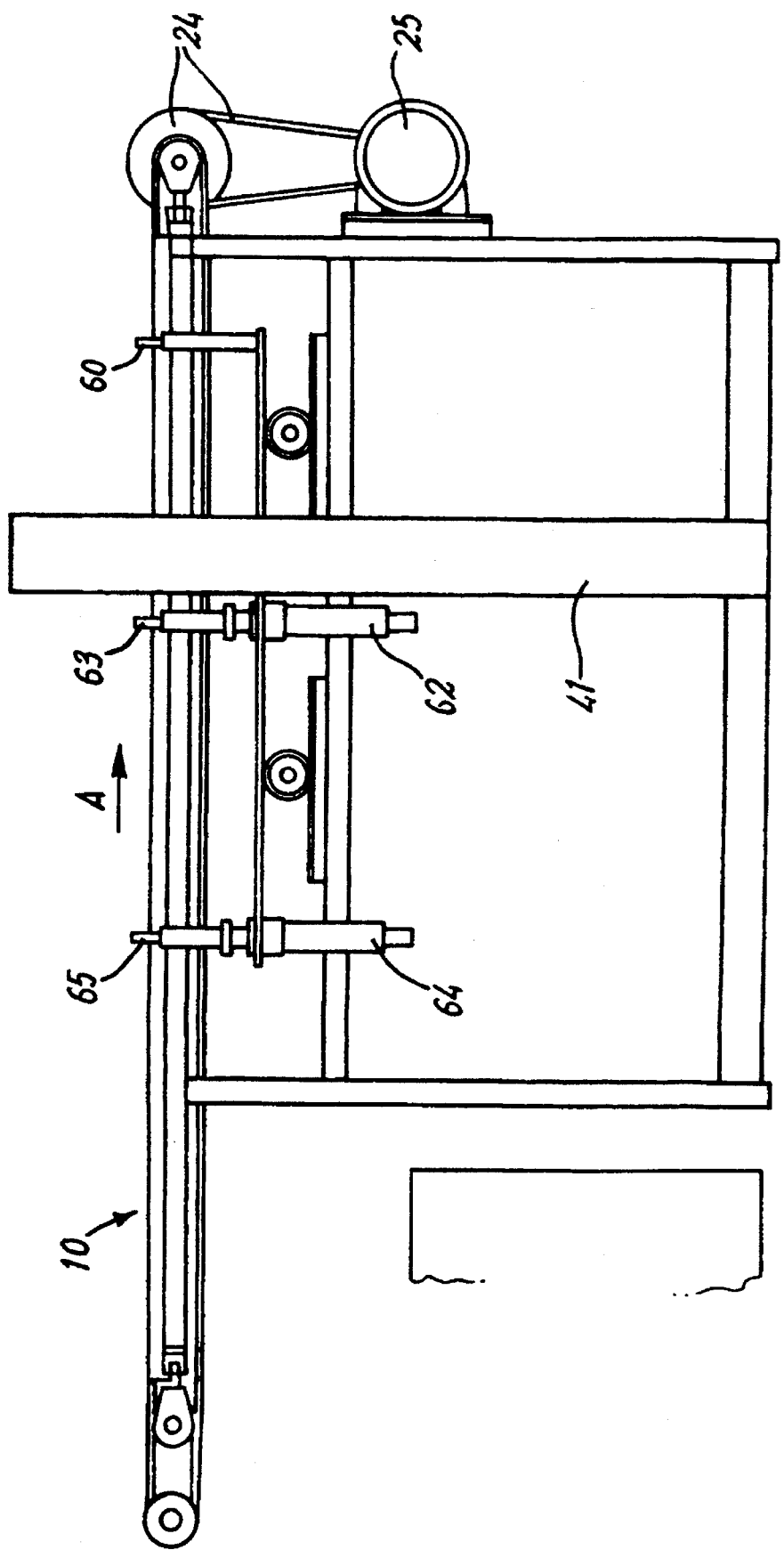
FIG. 2 is a side elevation of one of the input lines shown in FIG. 1.

To ensure correct positioning of plates beneath the suction members 48, stop means is provided in association with the input conveyors 20. As best seen in FIGS. 1 and 2, three series of pairs of stop members are mounted in alignment with the gaps between the belts 20. The first pair of stop members 60 are fixedly mounted and project upwardly beyond the upper surface of the conveyor 20 at all times. These form a stop for the first plate to be delivered on to the conveyor from the associated brushing unit and are positioned to locate the plate directly beneath the suction member 48 which is located furthest from the brushing unit. When the plate contacts the stop members its movement is arrested but the conveyor continues to travel beneath it and transport further plates discharged from the brushing unit along the conveyor in the direction of arrow 'A' in FIG. 2.

A pair of infra red sensing units 61A,61B are aligned with the central gap between the conveyor belts 20 and sense the passage of plates thereover. When the first plate passes the sensor 61A, a signal is generated which energises a pneumatic cylinder 62 on which a second pair of stop members 63 are carried. This moves the stop members 63 upwardly through the gaps between the belts 20 so that their upper ends project above the upper surface of the conveyor and arrest movement of the next plate to be delivered from the associated brushing unit. Passage of this second plate over the sensor 61A generates a further signal which energises a pneumatic cylinder 64 operative to move the third set of stop members 67 into an operative position in which their upper ends extend above the upper surface of the conveyor and thus arrest movement of the next plate to be discharged from the associated brushing unit.

When the transfer mechanism lifts the first and second plates clear of the input conveyor, the cylinders 62 and 64 are de-energised and the stop members 63 and 65 are withdrawn below the surface of the conveyor 20. This releases the third plate previously retained by the stop members 65 which then moves along the conveyor in the direction of arrow 'A' until it contacts the stop members 60. Movement of the next plate is then arrested by the stop members 63 and so forth as described previously.

Since the rate of deposit of plates on to the output conveyor is determined by the speed of the latter and not by the speed of delivery of plates to the input conveyor from the respective brushing units, there is a tendency for plates delivered from the brushing units to accumulate on the respective input conveyors. Means is therefore incorporated to delay delivery of plates from the brushing units when this condition arises. This is effected by the second infra red sensor 618 referred to previously.

When the stop members 65 are in their operative position and arrest movement of a plate discharged from the brushing unit, the plate obscures the second infra red sensor 618. This generates a signal which de-energises the associated brushing unit and thus prevents delivery of further plates until such time as the transfer mechanism has lifted the first two plates clear of the inlet conveyor, the stop members 63 and 65 have retracted and the third plate has moved along the conveyor to contact stop members 60. It will be appreciated this sequence of operations takes place independently in relation to both of the input conveyors and thus the output from both brushing units is controlled to ensure there is not an accumulation of brushed plates waiting for transfer to the single output conveyor 30.

Thus the apparatus described enables the output from two production lines to be transferred alternately to a single output line and controlled in such manner that articles are placed on the output line in equi-spaced relation to one another. This enables slower operations to be carried out in parallel on apparatus discharging to the respective input lines without the danger of articles being deposited on a single output line in variable or random spacing which would interfere with their subsequent processing further down the production line. In this way substantial increase in throughput of the line can be attained, governed by the speed at which the faster production operations rather than the slower operations can be carried out.

Various modifications may be made without departing from the invention. For example, while in the arrangement described plates are transferred two at a time from each input line to the common output line, they may be transferred singly or three or more at a time. Alternative forms of transfer mechanism may be employed if required and while in the embodiment described the apparatus is used to transfer plates from two cleaning or brushing units to a single glazing line, the invention may equally be applied in any situation where it is desired to transfer articles from parallel production lines to a single line.

Moreover while reference has been made herein primarily to the handling of articles of ceramic flatware or holloware, the invention may also be applied to the handling of a wide variety of other articles which require transfer from two or more input lines to a single output line.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method of transferring articles from two input production lines to a single independently driven output line comprising transferring products from each input line alternately from one and then the other input line onto the output line, and controlling the transfer of the articles onto the output line to transfer frequencies dependent on the rate of movement of articles along the output line, whereby articles from both input lines are alternately deposited in the output line in uniformly spaced relation.

2. A method according to claim 1 wherein transfer of articles onto said output line is delayed pending movement of articles previously deposited thereon along the line by a predetermined distance.

3. A method according to claim 2 wherein a plurality of articles is simultaneously transferred from each input line to said output line, said articles on said output line being equi-spaced in the direction of movement of said output line and transfer of the articles being delayed until the article last deposited on said output line has moved along the output line by a distance equal to the spacing between the articles transferred from said input line.

4. Apparatus for transferring articles from a plurality of input lines to a single independently driven output line, the apparatus including means for lifting articles from each input line in turn and transferring such articles to said output line and means for controlling deposit of said articles on said output line dependent on the rate of movement of the output line, whereby articles transferred from said input lines are placed on said output line in equi-spaced relation.

5. Apparatus according to claim 4 wherein said input and output lines each comprise continuously driven conveyors.

6. Apparatus according to claim 4 wherein said means for lifting articles from said input lines and depositing them on said output line comprises a transfer unit incorporating suction members operable to engage and transport the articles and means for releasing the suction whereby to deposit the articles on said output line.

7. Apparatus according to claim 6 wherein said transfer unit comprises a gantry extending across overlapping regions of both said input lines and said output line.

8. Apparatus according to claim 7 including a transfer mechanism slidably mounted in said gantry.

9. Apparatus according to claim 8 wherein said transfer mechanism incorporates a pair of cradle members stradling a horizontal portion of said gantry and spaced apart by a distance equal to the distance between the center lines of the input and output conveyors.

10. Apparatus according to claim 9 wherein said horizontal portion of said gantry comprises a rodless air cylinder having a pair of interlinked pistons respectively connected to said cradles.

11. Apparatus according to claim 10 wherein said pistons are connected to the respective cradles by pins projecting through a longitudinal slot in said cylinder closed by flexible seal means operative to open and close said slot during travel of said cradles relative to said gantry.

12. Apparatus according to claim 9 wherein said cradles include downwardly extending carrier arms on which said suction members are supported.

13. Apparatus according to claim 12 including means for raising and lowering said suction members relative to said cradles.

14. Apparatus according to claim 12 in which two of said carrier arms are provided on each of said cradles, said arms being spaced apart in the direction of movement of said input and output lines by a distance equal to the desired spacing between articles deposited on said output line.

15. Apparatus according to claim 4 including signalling means responsive to the presence of articles in said input lines to sense which of said input lines is further advanced and direct said transfer means initially to the further advanced input line on start-up of the apparatus.

16. Apparatus according to claim 4 including means to ensure correct positioning of articles delivered from said input lines beneath the associated transfer unit.

17. Apparatus according to claim 16 wherein said means to ensure positioning includes stop members engageable with successively delivered articles.

18. Apparatus according to claim 17 wherein said stop members include a first fixed stop member adapted to arrest movement of a first article in a position beneath said transfer unit, and sensing means operable in response to the presence of said first article to move a second stop member into an operative position in which it arrests movement of a second article beneath said transfer unit a predetermined distance from said first article.

19. Apparatus according to claim 18 including further sensing means operable in response to the presence of said second article to move a third stop member into an operative position behind said second article in which it is operative to arrest movement of the next article before the latter reaches said transfer unit.

20. Apparatus according to claim 17 wherein said input and output lines comprise continuously driven conveyors comprising spaced parallel belts and at least certain of said stop members are located beneath the gaps between said belts and adapted to project through said gaps to contact articles on the conveyors when moved to their operative positions.

21. Apparatus according to claim 19 including means operable on removal of said first and second articles by said transfer unit to retract said second and third stop members clear of said conveyor and permit said next article to move into contact with said first stop member.

22. Apparatus according to claim 4 including means operable in the event of an accumulation of articles on one of said input lines to suspend operation of a work station delivering to said one input line until at least some of the accumulated articles have been transferred to said output line.

23. Apparatus according to claim 19 including means operable in the event of an accumulation of articles on one of said input lines to suspend operation of a work station delivering to said one input line until at least some of the accumulated articles have been transferred to said output line, said means to suspend operation of said previous work station being actuated in response to movement of said third stop member to its operative position.

24. Apparatus according to claim 4 adapted to simultaneously transfer a plurality of articles from each input line in turn including means to maintain said articles a predetermined spaced distance apart corresponding to the desired spacing of articles on said output line.

25. Apparatus according to claim 24 wherein said means for maintaining the spacing of articles includes sensing means adapted to be driven in synchronism with said output line and control means operable to release articles from said transfer unit or receipt of signals from said sensing means.

26. Apparatus according to claim 25 in which said transfer unit is adapted to support a pair of articles spaced by a predetermined distance in the direction of travel of said output line, said control means being adapted to cause release of said articles from said transfer unit when the output line has moved forward by a distance equal to said spacing.

27. Apparatus according to claim 4 including control means operable in the event said transfer means fails to collect and/or deposit an article to energise warning means and/or initiate shut down of said input lines.

28. A process of supplying pottery objects to be glazed to a supply conveyor comprising:
 a) advancing objects to be transferred to the supply conveyor toward the supply conveyor with a pair of input conveyors;
 b) sequentially and alternately transferring pluralities of objects from one of the input conveyors and then the other input conveyor to the supply conveyor;
 c) spacing at least one object of each of said pluralities a given distance from another of the objects of the same plurality; and,
 d) coordinating the transfers of said pluralities with movement of the supply conveyor to place a lead one of the objects of each plurality on the supply conveyor at a location spaced from a trailing one of the objects already on the supply conveyor a distance substantially equal to said given distance.

29. A process according to claim 28 wherein transfer of articles onto said supply conveyor is delayed pending movement of articles previously transferred to the supply conveyor by a distance substantially equal to said given distance.

30. Apparatus for transferring articles from an input line to independently driven output line, the apparatus comprising:
 a) transfer means for transferring such articles to said output line;
 b) said input line including stop members engageable with successively delivered articles;
 c) said stop members include a first fixed stop member adapted to arrest movement of a first article in a pickup position; and,
 d) sensing means operable in response to the presence of such first article to move a second stop member of said input line into an operative position in which it arrests movement of a second article a predetermined distance from said first article.

31. Apparatus according to claim 30 including further sensing means operable in response to the presence of such second article to move a third stop member of the input line into an operative position behind such second article in which the third stop member is operative to arrest movement of the next article on the input line.

32. Apparatus according to claim 31 including means operable on removal of said first and second articles of said input line to retract said second and third stop members clear of said conveyor and permit said next article to move into contact with said first stop member.

33. Apparatus according to claim 30 wherein said input line is a conveyor having spaced parallel belts and at least certain of said stop members are located beneath gaps between said belts and the stop members when moved to their operative positions are adapted to project through said gaps to contact articles on the conveyor.

* * * * *